Dec. 4, 1962 — T. H. GAVIN — 3,066,552
SAW SHARPENING MACHINE
Filed April 25, 1960 — 6 Sheets-Sheet 1

FIG_1

INVENTOR.
THOMAS H. GAVIN
BY
Mason, Porter, Diller & Stewart
ATTORNEYS

Dec. 4, 1962

T. H. GAVIN 3,066,552

SAW SHARPENING MACHINE

Filed April 25, 1960

INVENTOR.
THOMAS H. GAVIN
BY
Mason, Porter, Diller & Stewart
ATTORNEYS

Dec. 4, 1962 T. H. GAVIN 3,066,552
SAW SHARPENING MACHINE
Filed April 25, 1960 6 Sheets-Sheet 4

INVENTOR.
THOMAS H. GAVIN
BY
Mason, Porter, Diller & Stewart
ATTORNEYS

United States Patent Office 3,066,552
Patented Dec. 4, 1962

3,066,552
SAW SHARPENING MACHINE
Thomas H. Gavin, 914 Evergreen Drive, Gretna, La.
Filed Apr. 25, 1960, Ser. No. 24,475
12 Claims. (Cl. 76—40)

This invention relates in general to new and useful improvements in sharpening machines, and more specifically relates to an improved saw sharpening machine for sharpening circular saws and band saws.

This application constitutes a continuation-in-part of my copending application Serial No. 567,858, filed February 27, 1956, now Patent No. 2,935,903, issued May 10, 1960.

The primary object of this invention is to provide a novel saw sharpening machine which is particularly designed for sharpening circular saws, and which machine, when once set, will automatically sharpen a circular saw in the desired manner.

Another object of this invention is to provide a novel saw sharpening machine which is provided with a rotary grinding wheel assembly for automatically sharpening teeth of saws, the grinding wheel assembly being of a nature which permits, with minor adaptations for the supporting of saws, the sharpening of either circular saw blades or band saw blades.

Another object of this invention is to provide a novel saw sharpening machine which is of a construction to permit the use of a rotary abrasive wheel in a manner to simulate the normal hand sharpening operation in order that the teeth of a saw being sharpened may be properly sharpened to desired angle or bevel.

Still another object of this invention is to provide a novel saw sharpening machine which includes an abrasive wheel and means for mounting the abrasive wheel in the manner to permit pressure contact between the abrasive wheel and the teeth of a saw being filed, with the pressure contact being variable by adjustment of suitable control means.

A further object of the invention is to provide a novel saw sharpening machine for sharpening circular saw blades, the saw sharpening machine including a rotary grinding wheel having mounting means to effect the elevation and lowering of the grinding wheel with respect to a saw blade and means for pivoting the grinding wheel each time it is elevated so that the grinding wheel is first disposed in angular relation with respect to the saw blade at one side thereof and then in a similar angular relation with respect to the sawblade at the opposite side thereof, and means for mounting a circular saw blade in a manner to effect the shifting of the saw blade one tooth each time the grinding wheel is elevated so that the sharpening of the saw blade in the desired manner is automatically accomplished.

With the above, and other objects in view that will hereinafter appear, the nature of the invention will be more clearly understood by reference to the following detailed description, the appended claims, and the several views illustrated in the accompanying drawings:

In the drawings:

FIGURE 15 is a schematic elevational view, showing the details of a mechanism which may be incorporated in the saw sharpening machine to permit the sharpening of band saw blades, hack saw blades and the like.

Figure 1:
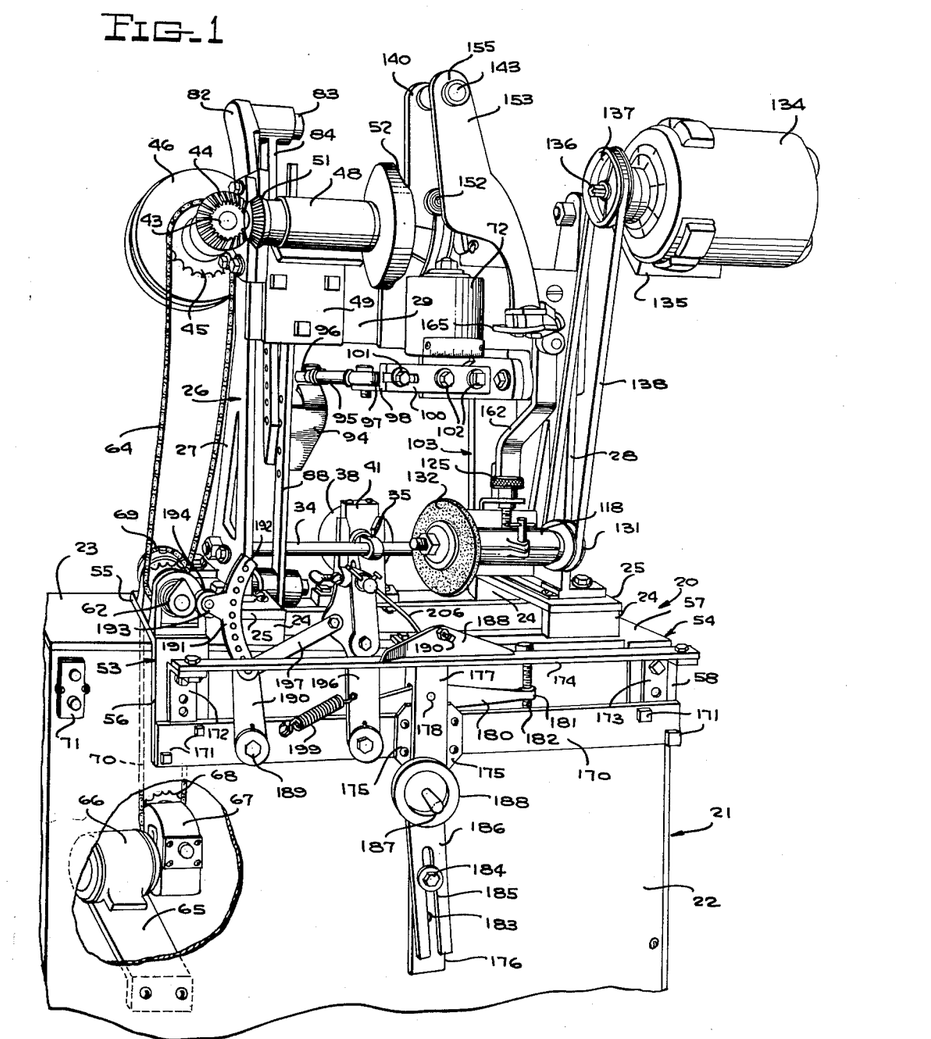
FIGURE 1 is a front perspective view of the saw sharpening machine of this invention, and shows the general details thereof, portions of the supporting base for the machine being broken away.

Referring now to the drawings in detail, it will be seen that the saw sharpening machine, which is the subject of this invention, is generally referred to by the reference numeral 20. The over-all machine is best illustrated in FIGURE 1. The saw sharpening machine includes a base which is generally referred to by the numeral 21. The base 21 may be fabricated of sheet plates, as is illustrated in the drawings, or may be in the form of a one-piece casting. The base 21, for the purpose of describing the invention, includes a front wall 22 and a top wall 23, among other walls.

Suitable spacer blocks 24 are mounted on the top wall 23, the spacer blocks 24 being disposed in a generally rectangular pattern with two of the spacer blocks 24 being disposed adjacent the forward face of the base 21 and two of the spacer blocks 24 being disposed adjacent the rear face of the base 21. A pair of transversely extending plates 25 rest upon the spacer blocks 24 and are suitably secured thereto. The plates 25 function as suitable ways for a carriage which is generally referred to by the numeral 26 to effect the shifting of the position of the carriage 26 transversely of the base 21 in a manner to provide a necessary adjustment to be described in detail hereinafter.

The carriage 26 includes a pair of upstanding end members 27, 28 which are generally triangular in outline. The end members 27, 28 are connected together by an upper longitudinally extending plate 29 which is vertically disposed. As is best illustrated in FIGURE 2, the plate 29 is secured to suitable brackets 30 carried by the end members 27, 28 by means of bolts 31.

The end members 27, 28 have feet 32 at the lower corners thereof, which feet rest upon the plates or ways 25 and are secured thereto by suitable hold-down bolts 33. It is to be understood that the bolts 33 pass through suitable slots in the plates or ways 25 to permit a limited transverse adjustment of the carriage 26.

Figure 9:
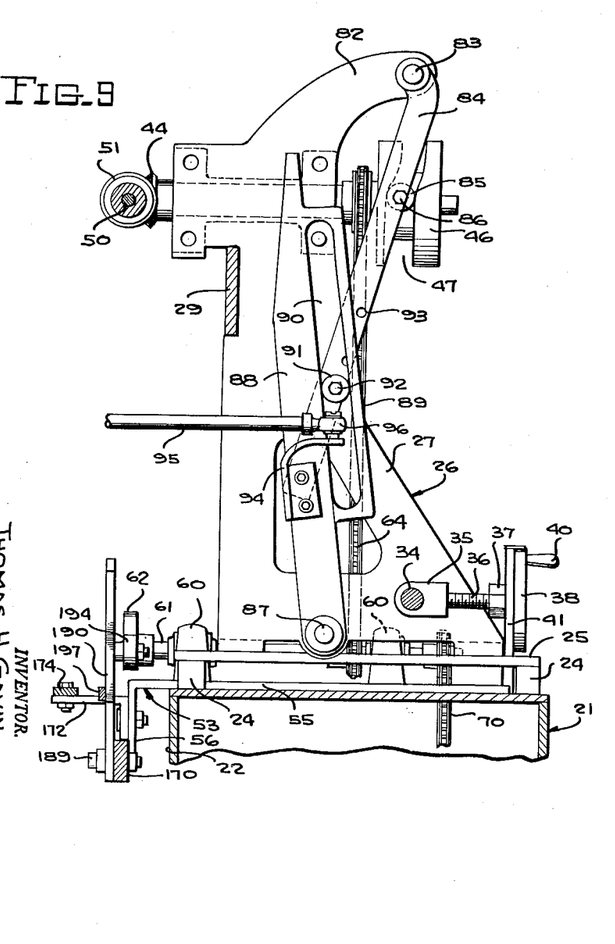
FIGURE 9 is a transverse sectional view on a large scale, taken through the upper portion of the machine, and shows further the details of the means for effecting the pivoting of the mounting means for the grinding wheel about a vertical axis.

The end members 27 are connected together by a tie rod 34 which extends between the lower rear portions thereof. The tie rod 34, as is best shown in FIGURE 9, has a fitting 35 secured to the central portion thereof. A feed screw 36 is threaded into the rear part of the fitting 35 and is fixedly secured thereto. An adjusting nut 37 is threaded onto the feed screw 36, the adjusting nut 37 being carried by an adjusting hand wheel 38 having a handle 40. A suitable guide bracket 41 is carried by the rear part of the base 21 and projects upwardly therefrom between the nut 37 and the wheel 38. This prevents the movement of the nut 37 and the wheel 38 transversely of the base 21 so that when the nut 37 is rotated to feed on the feed screw 36, the carriage 26 will be shifted transversely of the base 21 to the desired position.

Figure 2:
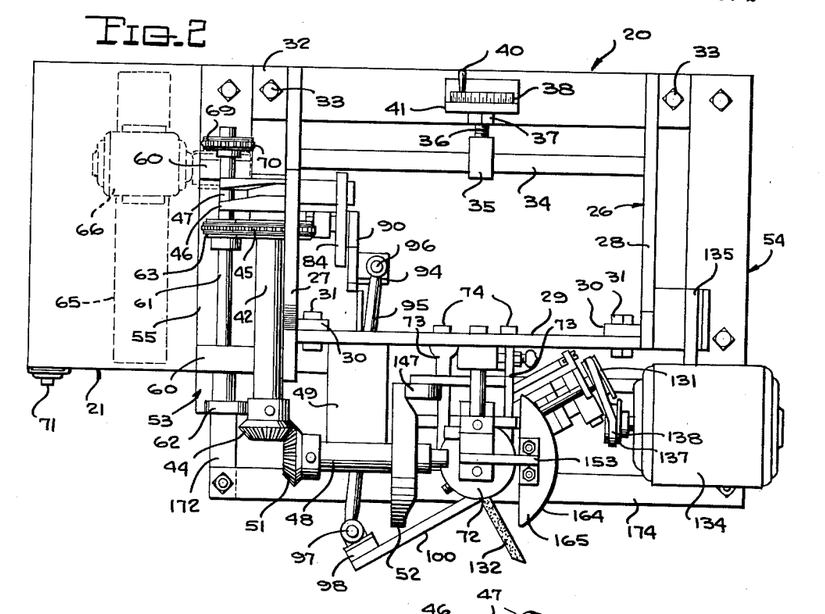
FIGURE 2 is a plan view of the saw sharpening machine of FIGURE 1, and shows further the arrangement of the various components thereof.
Figure 3:
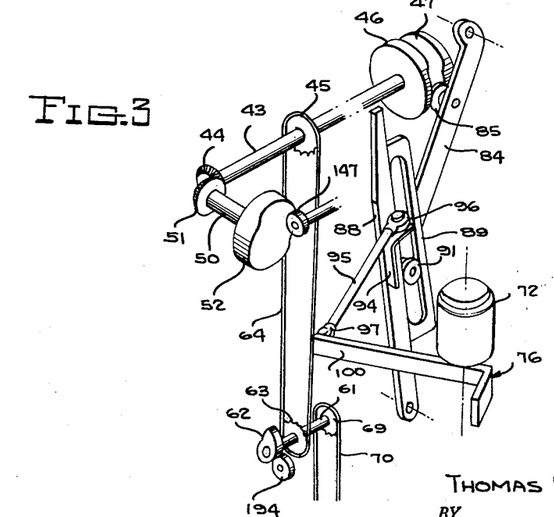
FIGURE 3 is a schematic perspective view showing the arrangement of the drive train of the means for locking the support for the grinding wheel.

As is best shown in FIGURES 1, 2 and 9, a bearing unit 42 is secured to the left upper portion of the end member 27. The bearing unit 42 extends transversely of the base 21 and supports a shaft 43 for rotation. A bevel gear 44 is mounted on the forward end of the shaft 43 at the forward end of the bearing unit 42. A sprocket 45 is mounted on the shaft 43 at the rear of the bearing unit 42, the sprocket 45 being disposed generally along the longitudinal center line of the base 21. A cam wheel 46 is mounted on the rear end of the shaft 43 immediately rearward of the sprocket 45. The cam wheel 46 is of a type having a cam track or groove 47 formed therein to effect a positive two-dimensional movement of a follower.

A bearing unit 48 is disposed at the front upper left hand corner of the carriage 26 and is secured to the longitudinal plate 29 thereof by a suitable mounting bracket 49. The bearing unit 48 carries a shaft 50 for rotation. A bevel gear 51 is mounted on the left end of the shaft 50 and is meshed with the bevel gear 44. A cam wheel 52 is mounted on the right end of the shaft 50. It will be readily apparent that the shaft 50 is driven from the shaft 43 by means of the bevel gears 44 and 51. In this manner, the cam wheels 46 and 52 are driven in unison.

Reference is again made to FIGURE 1 in particular, wherein there is illustrated a pair of angle support members 53 and 54. The angle support member 53 is disposed to the left of the carriage and includes a horizontal leg 55 which overlies and is secured to the top wall 23 of the base 21. The angle support member 53 also includes a vertical leg 56 which depends immediately in front of the front wall 22 of the base 21. The angle support member 54 is very similar to the angle support member 53, and includes a horizontal leg 57 which overlies the top wall 23 of the base 21 and is suitably secured thereto. The angle support member 54 also includes a depending leg 58 which is disposed immediately in front of the front wall 22.

A pair of bearing units 60 are carried by the leg 55. The bearing units 60 are spaced apart and have supported therein for rotation a shaft 61 which extends transversely of the base 21. The shaft 61 has a cam 62 secured to the forward end thereof for rotation therewith. A sprocket 63 is secured to the intermediate part of the shaft 61 in alignment with the sprocket 45. A drive chain 64 is entrained over the two sprockets 63 and 45. In this manner, the shaft 43 is driven from the shaft 61.

A suitable mounting bracket 65 is mounted within the base 21, as is best shown in FIGURE 1. An electric motor 66 is carried by the mounting bracket 65. The electric motor has coupled thereto a gear reduction unit 67 which includes a drive sprocket 68. The drive sprocket 68 is aligned with a sprocket 69 carried by the shaft 61. A drive chain 70 is entrained over the sprockets 68 and 69 so as to drivingly connect the shaft 61 to the electric motor 66 to be driven thereby. A suitable control switch 71 is mounted on the upper left hand corner of the front wall or panel 22 for controlling the operation of the electric motor 66.

Figure 4:
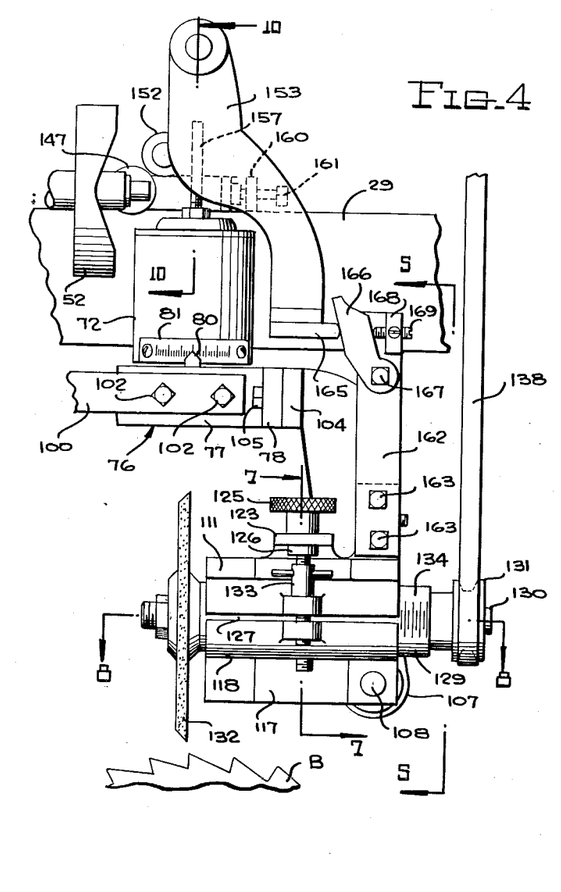
FIGURE 4 is an enlarged fragmentary elevational view showing the details of the grinding wheel and the means mounting the same, the grinding wheel being disposed in an intermediate position out of engagement with the circular saw blade to be sharpened thereby.

A bearing unit 72 is disposed forwardly of the carriage 26 and is secured to the longitudinal plate 29 thereof by means of suitable support arms 73, which support arms 73 are secured to the plate 29 by means of bolts 74. The bearing unit 72 suitably supports a vertically disposed shaft 75 in the manner best illustrated in FIGURE 10. As is best shown in FIGURE 4, a suitable angle fitting 76 is secured to the lower end of the shaft 75 for pivoting therewith. The angle fitting 76 includes a leg 77 and a leg 78, the legs being disposed generally at right angles to each other. The leg 77 has a pointer 80 projecting upwardly therefrom, which pointer is aligned with a suitable gauge 81 to indicate the amount of swing of the shaft 75.

Pivoting of the shaft 75 and the fitting 76 carried thereby is accomplished in the following manner. The end member 27 of the carriage 26 is provided with an upwardly and rearwardly curving extension 82, as is best illustrated in FIGURE 9. The extension 82 carries a horizontal shaft 83 on which a lever 84 is pivotally mounted. The lever 84 has a follower 85 secured to an intermediate portion thereof by means of a bolt 86. The follower 85 is in the form of a wheel which is disposed within the cam track 47 of the cam wheel 46. Thus, as the cam wheel 46 rotates, the lever 84 is pivoted back and forth transversely of the base 21 about the shaft 83.

A second shaft 87 is carried by a lower portion of the end member 27. An upstanding lever 88 is pivotally mounted on the shaft 87 for swinging movement in a plane disposed transversely of the base 21. The rear part of the lever 88 is provided with a vertically extending yoke 89 defining a guideway 90. A follower 91 secured to a lower portion of the lever 84 by means of a bolt 92 is disposed within the guideway 90 to effect the back-and-forth movement of the lever 88 as the lever 84 moves back and forth. The lever 84 is provided with a plurality of openings 93 through which the bolt 92 may be passed so as to vertically adjust the position of the follower 91 and in this manner adjust the amount of pivot of the lever 88.

The lower portion of the lever 88 is provided with a suitable bracket 94 which, in turn, is coupled to a rod 95 by means of a suitable ball joint connection 96. The opposite end of the rod 95, as is best illustrated in FIGURE 1, is provided with a ball joint connector 97 which is secured to a bracket 98. The bracket 98 is adjustably secured to an extension arm 100 by means of a bolt 101. The extension arm 100 is secured to the leg 77 of the fitting 76 by means of bolts 102. Thus, as the lever 88 pivots back and forth, the rod 95 will effect the pivoting or rocking of the shaft 75 and the fitting 76. As previously indicated, the amount of rocking of the shaft 75 is indicated by the dial 81 and the pointer 80.

Figure 6:
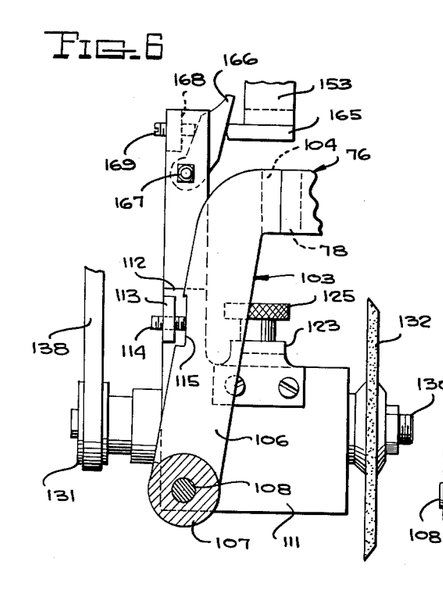
FIGURE 6 is an enlarged fragmentary vertical sectional view taken along the line 6—6 of FIGURE 5, and shows the means for effecting and limiting the tilting of the grinding wheel about a horizontal axis.
Figure 7:
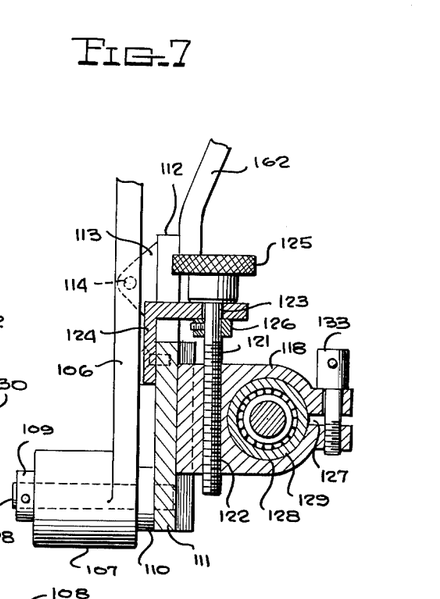
FIGURE 7 is an enlarged fragmentary vertical sectional view, taken along the line 7—7 of FIGURE 4, and shows the specific mounting of the shaft for the grinding wheel, including the manner in which it is vertically adjusted.
Figure 8:
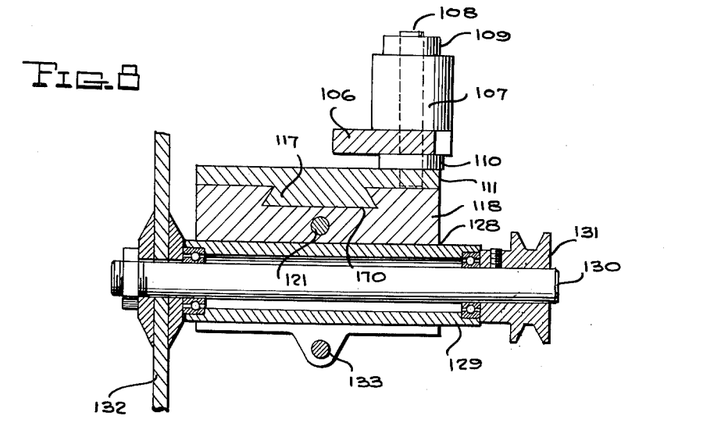
FIGURE 8 is an enlarged fragmentary horizontal sectional view, taken along the line 8—8 of FIGURE 4, and shows further the details of the manner in which the shaft for the grinding wheel is mounted.

Reference is now made to FIGURES 6, 7 and 8, wherein the general details of a support 103 carried by the fitting 76 are illustrated. The support 103 includes a generally horizontal leg 104 which is secured to the leg 78 of the fitting 76 by means of bolts 105, as is best illustrated in FIGURE 4. The support 103 also includes a downwardly extending leg 106 which slopes slightly to the left. A boss 107 is formed on the lower end of the leg 106 and extends rearwardly therefrom. The boss 107 carries a shaft 108 which is retained within the boss 107 by means of collars 109 and 110. The collar 110 serves as a spacer to maintain a support plate 111 forwardly of the leg 106, the support plate 111 being secured to the forward end of the shaft 103.

As is best illustrated in FIGURE 6, the support plate 111 has an upward extension 112 which carries an offset ear 113 which is disposed to the left of the leg 106, as viewed in FIGURE 6. The ear 113 carries a stop screw 114 which engages a seat 115 formed on the leg 106 intermediate the ends thereof. It will be readily apparent that the stop screw 114 serves to limit the downward pivoting of the support plate 111, while permitting the support plate 111 to be pivoted upwardly as is necessary during a saw grinding operation.

The support plate 111 has a vertically extending dovetail 117 formed on one face thereof. A mounting block 118 having a dovetail recess 120 is slidably mounted on the dovetail 117 to facilitate vertical adjustment of the mounting block 118 with respect to the support plate 111. Vertical adjustment of the mounting block 118 is accomplished by means of a feed screw 121 which extends through a threaded bore 122 in the mounting block 118. The upper portion of the feed screw 121 is plain and passes through a bore 123 in an angle bracket 124 which is secured to the support plate 111. The feed screw 121 has a knob 125 on the upper end thereof to facilitate rotation thereof, and a collar 126 is disposed in spaced relation with respect to the knob 125, the knob 125 and the collar 126 being disposed closely adjacent to opposite surfaces of the angle bracket 124 to prevent shifting of the feed screw 121 longitudinally of its axis.

The mounting block 118 is split, as at 127. The mounting block 118 has a bore 128 therethrough, into which the slit 127 opens. A bearing unit 129 extends through the bore 128 and projects from opposite ends of the mounting block 118. A shaft 130 is rotatably journaled in the bearing unit 129 and projects from opposite ends thereof. A drive pulley 131 is mounted on one end of the shaft 130 and a grinding wheel 132 is removably mounted on the opposite end of the shaft 130.

It is necessary that the grinding wheel 132 be properly aligned with the saw blade which is to be sharpened. It is for this reason that it is necessary that the bearing unit 129 be adjustable longitudinally through the bore 128 in the mounting block 118. The mounting block 118 is clamped about the bearing unit 129 by means of a clamp screw 133 which extends through the two halves of the mounting block 118 across the slit 127. As is best shown in FIGURE 4, the bearing unit 129 is provided with suitable scale 134 on the front face thereof to facilitate the proper positioning of the grinding wheel 132.

As is best illustrated in FIGURE 1, an electric motor 134 is mounted in an elevated position generally above and to the right of the pulley 131. The electric motor 134 is supported from the end member 28 by means of a suitable mounting bracket 135 which may be vertically adjustable, if desired. The electric motor 134 has an armature shaft 136 in which a drive pulley 137 is secured. The pulleys 137 and 131 are connected together by a drive belt 138 entrained thereover.

Figure 10:
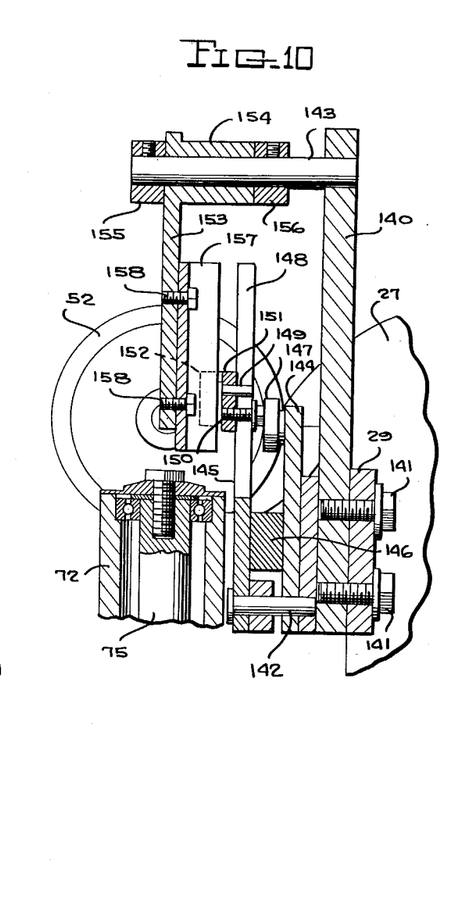
FIGURE 10 is an enlarged fragmentary vertical sectional view, taken along the line 10—10 of FIGURE 4, and shows the details of the manner in which the grinding wheel is mounted for pivotal movement about a vertical axis, and the means for effecting the pivoting of the grinding wheel about a horizontal axis.

Reference is now made to FIGURE 10 in particular wherein an upstanding support 140 is illustrated as being secured to the longitudinal plate 29 by means of bolts 141. The support 140 carries a lower pivot shaft 142 and an upper pivot shaft 143.

A pair of levers 144 and 145 are mounted on the shaft 142 for pivotal movement. The levers 144, 145 are connected together by a block 146 for pivoting in unison. The lever 144 carries a follower 147 which bears against the cam 52 to effect the rocking of the levers 144, 145.

The upper portion of the lever 145 is slotted, as at 148, and fasteners 149, 150 for a mounting block 151 pass through the slot 148 and secure the mounting block 151 to the lever 145 for vertical adjustment. A follower 152 is carried by the mounting block 151.

A lever 153 is mounted on the shaft 143 for pivotal movement, the lever 153 including a boss 154. The lever 153 is positioned on the shaft 143 by means of collars 155, 156. An angle bracket 157 is secured to the rear surface of the lever 153 by means of fasteners 158. The follower 152 bears against the angle bracket 157 to pivot the lever 153 when the lever 145 pivots. Due to the adjustment of the mounting block 151 and the follower 152 carried thereby, the amount of movement of the lever 153 in response to the movement of the lever 145 may be varied.

As is best shown in dotted lines in FIGURE 4, the lever 153 has an ear 160 which projects rearwardly from the rear surface thereof. The ear 160 carries an adjustable stop screw 161 which is engageable with the support member 140 to limit the swinging movement of the lever 153 to the left, as viewed in FIGURE 4.

Figure 5:
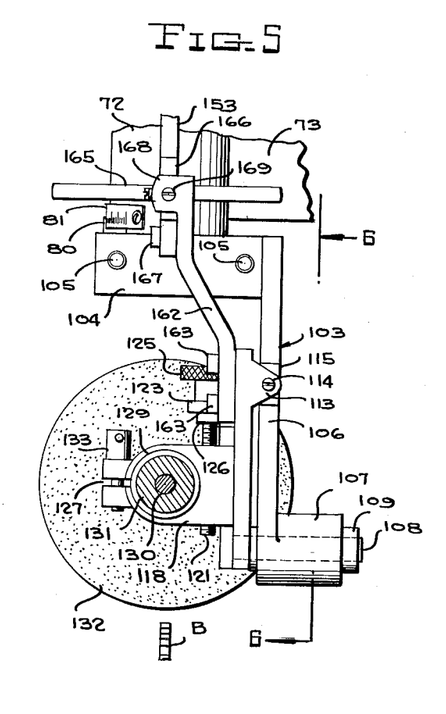
FIGURE 5 is a fragmentary enlarged vertical sectional view, taken along the line 5—5 of FIGURE 4, and further shows the details of the mounting means for the grinding wheel.

Reference is now made to FIGURES 4 and 5 in particular, wherein it is seen that the support plate 111 has an extension arm 162 secured to the extension thereof by means of bolts 163. The extension arm 162 is of an offset type (see FIGURE 5), and has the upper end thereof terminating in alignment with and adjacent to a curved edge 164 of a plate 165 which is horizontally disposed and which is carried at the lower end of the lever 153. The outline of the plate 165 is best illustrated in FIGURE 2. The extension arm 162 has a link 166 pivoted thereto by means of a pivot member 167. The link 166 engages the curved edge 164 of the plate 165. The upper end of the extension arm 162 terminates in an offset ear 168 which carries an adjustable stop screw 169, the stop screw 169 being aligned with and engaging the link 166. Thus, movement of the link 166 to the right is prevented. On the other hand, the effectiveness of the connection between the plate 165 and the extension arm 162 may be varied by varying the position of the stop screw 169, thus varying the position of the link 166 with respect to the extension arm 162.

From the foregoing, it will be apparent that as the cam 52 rotates, the follower 147 is moved back and forth from left to right. As a result, the lever 144 is pivoted with the result that the lever 145 is likewise pivoted, the levers 144 and 145 being connected together. The lever 145 pivots the lever 153 through the use of the follower 152. The plate 165, being carried by the lever 153, pivots with the lever 153 and through its engagement with the link 166, pivots the extension arm 162. The extension arm 162, being rigidly connected to the support plate 111, pivots the support plate 111 about the pin 108 to raise and lower the grinding wheel 132. It is to be understood that the raising and lowering of the grinding wheel 132 is in timed relation to the pivoting of the grinding wheel 132 about a vertical axis. At this time, it is pointed out that the grinding wheel 132 is centered on the axis of the shaft 75 when it is disposed in a plane extending transversely of the base 21.

Reference is again made to FIGURE 1 in particular, wherein it will be seen that the vertical legs 56 and 58 of the angle brackets 53 and 54, respectively, are disposed forwardly of the front wall 22 of the base 21. The lower ends of the legs 56, 58 are connected together by a vertically disposed, longitudinally extending bar or plate 170 which is secured to the legs 56, 58 by means of suitable fasteners 171. The leg 56 has an angle bracket 172 secured thereto and the leg 58 has an angle bracket 173 secured thereto. The angle brackets 172 and 173 are adjustably mounted so as to control the vertical position of a horizontally disposed bar 174 which extends longitudinally between and is connected to the upper parts of the angle brackets 172 outwardly of the plate 170.

A pair of spaced apart guides 175 are secured to the central portion of the plate or bar 170 on the forward face thereof. A vertically disposed support 176 having a generally U-shaped upper portion 177 is engaged over the bar 170 between the guides 175 for vertical movement. It is to be understood that the support 176 tightly frictionally engages the bar 170 and resists movement except when urged. In order to provide for the vertical adjustment of the support 176, the U-shaped upper portion 177 carries a pivot pin 178 on which there is pivotally mounted a lever 180, which lever extends through the U-shaped portion 177 and overlies the bar 170. One end of the lever 180, the left end, rests upon the bar 170. The right end of the lever 180 is provided with an enlarged end portion 181 through which an adjusting screw 182 is threaded. The adjusting screw 182 has the lower end thereof bearing against the upper edge of the bar 170, and by adjusting the position of the adjusting screw 182, the vertical position of the support 176 may be varied. It is to be understood that the adjustment of the support 176 is for minute adjustment in a manner which will be described in detail hereinafter.

The lower portion of the support 176 has a plurality of openings 183 through which a fastener 184 is selectively passed. The fastener 184 is received in an elongated slot 185 of a support arm 186. The upper end of the support arm 186 carries an arbor 187 on which a circular saw blade to be sharpened may be mounted. The arbor 187 has associated therewith a back-up plate 188. It is to be understood that by adjusting the fastener 184 and the support arm 186, the arbor 187 may be adjusted, as desired, in order to properly position the circular saw blade to be sharpened closely adjacent its desired position. Then, the circular saw blade can be finally accurately vertically positioned by utilizing the screw 182.

The bar 174 has a bracket 189 projecting upwardly therefrom. The bracket 189 carries an adjustable screw 190, the head of which is engageable with a side of a circuit saw blade so as to reinforce the circular saw blade during the sharpening operation. It is to be understood that the screw 190 is to be disposed adjacent that portion of the circular saw blade being sharpened, and thus receives an immediate transfer of the force exerted on the saw blade.

The left portion of the bar 170 is provided with a pivot 189 on which an upstanding lever 190 is mounted. The lever 190 has an arcuate upper portion 191 in which a plurality of apertures 192 are formed. The arcuate portion 191 also has an intermediate ear 193 which projects to the left and which carries a follower 194 engaged with the cam 62.

Figures 11, 12:
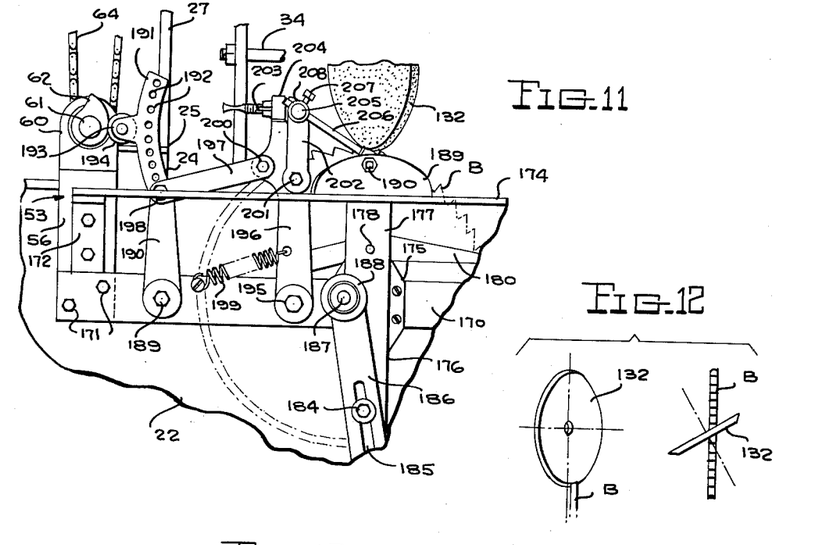
FIGURE 11 is an enlarged fragmentary elevational view showing the specific manner in which a circular saw is mounted and the means for effecting the rotation of the circular saw in a step-by-step manner as the sharpening operation proceeds.
FIGURES 12, 13 and 14 are schematic views showing the relationship of the grinding wheel with respect to a saw blade during the various stages of a saw sharpening operation.

As is best illustrated in FIGURE 11, the bar 170 also has a pivot member 195 disposed to the left of the center thereof. An upstanding lever 196 is carried by the pivot 195. The lever 196 is connected to the lever 190 by means of a link 197, a left end of the link 197 having a pivot 198 which is selectively positioned through one of the openings 192. The lever 196 is provided with a return spring 199. The opposite end of the link 197 has a pivot 200 which extends through the lever 196. Thus, the lever 196 is connected to the lever 190 for pivoting therewith. However, due to the adjustability of the pivot 198 along the length of the lever 190, the stroke of the lever 196 may be varied.

The lever 196 carries a pivot 201 on which a tool holding link 202 is pivotally mounted. The tool holding link 202 is adjusted relative to the link 196 by means of a setscrew 203 threadedly engaged with an extension 204 of the link 196 and secured to the link 202 for rotation. A shaft 205 is rotatably supported by the link 202 and has a transverse bore through which a rod 206 extends. The rod 206 is adjusted within the bore of the shaft 205 by means of a locking screw 207. A coil spring 208 encircles the shaft 205 and has one end thereof anchored to the shaft 205 and the opposite end thereof anchored to the link 202. The coil spring 208 acts to urge the rod 206 downwardly into engagement with a saw blade, such as the saw blade B of FIGURE 1.

It is to be understood that the adjustment of the link 197 and its connection with the lever 190 is to vary the stroke of the rod 206 to be that equal to the spacing between teeth of the saw blade B. The setscrew 203 adjusts the initial position of the rod 206 so that in the return position of the rod 206, it drops just behind a saw tooth to provide the desired stroke. The coil spring 208 permits the rod 206 to pivot, together with the shaft 205, so as to ride up and over the saw teeth during the return stroke of the rod 206.

Figure 13:
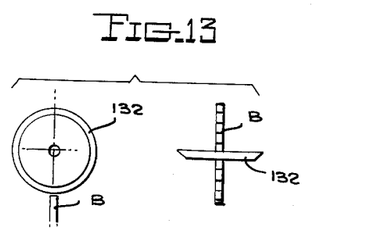
Figure 14:
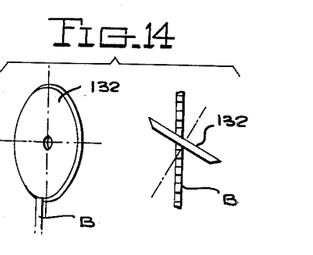

Attention is now directed to the schematic views of FIGURES 12, 13 and 14. In FIGURE 13, the grinding wheel 132 is illustrated in its neutral inoperative position wherein the grinding wheel 132 is elevated above the saw blade B and is disposed generally at right angles to the plane of the saw blade B. It is when the grinding wheel 132 is in this position that the rod 206 is actuated to rotate the saw blade B one tooth for the next sharpening operation.

In FIGURE 12, the grinding wheel is illustrated in one of its two grinding or sharpening positions. The grinding wheel 132 has been rotated so as to be angularly disposed with respect to the saw blade B and is lowered into engagement with the saw blade B. Further, the center of the grinding wheel 132 is now shifted from its position aligned with the saw blade B of FIGURE 13 to a position to the left of the saw blade B.

In FIGURE 14, the second saw grinding or sharpening position of the grinding wheel 132 is illustrated. It is to be noted that the angular relationship of the grinding wheel 132 with respect to the saw blade B has been reversed. Further, the center of the grinding wheel 132 is now shifted to the right of the saw blade B.

It is to be understood that during the grinding operation, the grinding wheel 132 grinds not only the front face of the tooth to be ground, but also the back face of the preceding tooth to provide the proper clearance angle on that tooth. It is also to be understood that since the angle of the grinding wheel 132 with respect to the saw blade B is reversed between each grinding operation, the necessary bevel on the alternating teeth is provided. In addition, due to the fact that the center of the grinding wheel 132 shifts from one side of the saw blade to the other as the angle of the grinding wheel 132 is alternated, there will be the desired filling operation in addition to a transverse bevel on the teeth of the saw blade B. This method of forming the teeth of circular saws eliminates the danger of lumber being kicked back while being sawed.

At this time, it is pointed out that the pressure of the grinding wheel 132 on the saw blade B may be varied by adjusting the setscrew 114. If it were not for the setscrew 114, the entire weight of the grinding head would be imposed upon the grinding wheel 132. However, by properly adjusting the setscrew 114, a portion of this weight during the grinding operation may be transferred to the support member 103.

Figure 15:
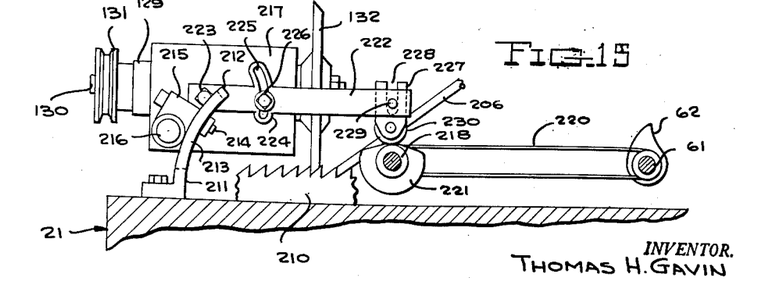

Referring now to FIGURE 15 in particular, it will be seen that there has been illustrated schematically a conversion unit for the saw sharpening machine 20 which permits the sharpening of band saw blades, such as the band saw blade 210. Suitable support means for the band saw blade 210 will be provided in lieu of the circular saw blade support means, which support means will support the band saw blade 210 in the position illustrated in FIGURE 15 for movement from right to left. The rod 206 may engage the teeth of the band saw blade 210 to effect the timed advancement of the band saw blade 210 in conjunction with the positioning of the grinding wheel 132.

In order to utilize the saw sharpening machine 20 to sharpen band saw blades, such as the blade 210, it is necessary that the means for mounting the grinding wheel 132 be changed. In lieu of the previously disclosed means for mounting the grinding wheel 132, there is secured to the base 21 a bracket 211 having an arcuate portion 212 with an elongated slot 213 therein. A suitable fastener 214 is adjustably positioned within the slot 213 and secures to the bracket 211 a fitting 215. The fitting 215 carries a shaft 216 which extends transversely of the base 21. The shaft 216 supports for pivotal movement a support plate 217 which corresponds to the support plate 111. The support plate 217 carries all of the other supporting mechanisms for the grinding wheel 132 and its shaft 130, including the bearing unit 129.

When the band saw blade sharpening attachment is utilized, an additional shaft 218 is mounted on the base 21 parallel to the shaft 216. The shaft 218 will be suitably mounted, such as is the shaft 61. The shafts 218 and 61 will be suitably connected together by a drive belt 220. The shaft 218 will carry a cam 221.

An arm 222 is carried by the support plate 217. The left end of the arm 222, as viewed in FIGURE 15, is pivotally connected to the support plate 217 by means of a fastener 223. The arm 222 has an arcuate enlarged portion 224 in which an arcuate slot 225 is formed. A second fastener 226 passes through the slot 225 and is secured to the support plate 217. In this manner, the arm 222 may be adjustably secured to the support plate 217.

A fitting 227 is carried by the right end of the arm 222. The fitting 227 is provided with a slot 228 through which a fastener 229 passes. The fastener 229 adjustably secures the fitting 227 to the arm 222. The fitting 227 carried a follower 230 which engages the cam 221.

It is to be understood that the cam 221 is rotated in timed relation to the cam 62, which cam 62 effects the operation of the rod 206 to feed the band saw blade 210. Thus, the cam 221 serves to elevate the grinding wheel 132 and while the grinding wheel 132 is so elevated, the cam 62 serves to actuate the rod 206 to advance the saw blade 210 one tooth. The grinding wheel 132 is then again lowered to effect the desired sharpening of the teeth of the saw blade. It is to be understood that the axis of the shaft 130 pivots only about shaft 216 and that the grinding wheel 132 is disposed normal to the saw blade 210 during the grinding operation.

The adjustment of the arm 222 with respect to the support plate 217 and the fitting 227 with respect to the arm 222 permits the grinding wheel 132 to be raised and lowered during its grinding operation so that variations in diameters in grinding wheels and variations in heights of the saw blades 210 may be compensated for.

Although the grinding wheel will usually be swiveled from side to side during the saw sharpening operation, in the sharpening of certain types of saws, for example, rip saws, it may not be desired to swivel the grinding wheel. In such event, the mechanisms for pivoting the grinding wheel support will be disconnected.

From the foregoing, it will be seen that novel and advantageous provision has been made for carrying out the desired end. However, attention is again directed to the fact that variations may be made in the example apparatus disclosed herein without departing from the spirit and scope of the invention, as defined in the appended claims.

I claim:

1. A saw sharpening machine comprising a base, a grinding head, means carried by said base mounting said grinding head for movement about a horizontal axis, said grinding head including a grinding wheel having an axis of rotation disposed generally normal to said horizontal axis, said means also including means for vertically adjusting the position of said grinding head relative to said horizontal axis to compensate for wearing of said grinding wheel and thus preventing interference between said grinding wheel and a saw blade during a tooth grinding operation, means for periodically elevating said grinding wheel by pivoting said grinding head about said axis to simultaneously elevate and tilt said grinding wheel, and means for advancing a saw blade relative to said grinding wheel in a tooth-by-tooth movement when said grinding wheel is elevated, said saw blade advancing means including a rotating shaft carried by said base, a cam on said rotating shaft, linkage pivotally mounted relative to said base and engaged by said cam for pivoting thereby, and a saw blade tooth engaging member carried by said linkage, said grinding wheel elevating means including a second shaft mounted on said base and driven in timed relation to said first shaft, a second cam carried by said second shaft, and second linkage connected to said grinding head engaged by said second cam for pivoting thereby.

2. A saw sharpening machine comprising a base, a grinding head, means carried by said base mounting said grinding head for movement about a horizontal axis, said grinding head including a grinding wheel having an axis of rotation disposed generally normal to said horizontal axis, means for periodically elevating said grinding wheel by pivoting said grinding head about said axis to simultaneously elevate and tilt said grinding wheel, and means for advancing a saw blade relative to said grinding wheel in a tooth-by-tooth movement when said grinding wheel is elevated, said saw blade advancing means including a rotating shaft carried by said base, a cam on said rotating shaft, linkage pivotally mounted relative to said base and engaged by said cam for pivoting thereby, and a saw blade tooth engaging member carried by said linkage, said linkage including a first lever engaged with said cam and a second lever adjacent said first lever, a link extending between and connecting together said first and second levers, said link having an adjustable connection with said first lever to vary the stroke of said second lever in relation to said first lever whereby the movement of said saw tooth engaging member corresponds to the spacing of saw teeth.

3. The machine of claim 2 wherein said second lever has a link adjustably mounted thereon and said saw tooth engaging member is supported by said last mentioned link.

4. A saw sharpening machine comprising a base, a grinding head, means carried by said base mounting said grinding head for movement about a horizontal axis, said grinding head including a grinding wheel having an axis of rotation disposed generally normal to said horizontal axis, means for periodically elevating said grinding wheel by pivoting said grinding head about said axis to simultaneously elevate and tilt said grinding wheel, and means for advancing a saw blade relative to said grinding wheel in a tooth-by-tooth movement when said grinding wheel is elevated, said saw blade advancing means including a rotating shaft carried by said base, a cam on said rotating shaft, linkage pivotally mounted relative to said base and engaged by said cam for pivoting thereby, and a saw blade tooth engaging member carried by said linkage, said linkage including a first lever engaged with said cam and a second lever adjacent said first lever, a link extending between and connecting together said first and second levers, said link having an adjustable connection with said first lever to vary the stroke of said second lever in relation to said first lever whereby the movement of said saw tooth engaging member corresponds to the spacing of saw teeth, said grinding wheel elevating means including a second shaft mounted on said base and driven in timed relation to said first shaft, a second cam carried by said second shaft, and second linkage connected to said grinding head engaged by said second cam for pivoting thereby.

5. A saw sharpening machine comprising a base, a grinding head, means carried by said base mounting said grinding head for movement about a horizontal axis, said grinding head including a grinding wheel, means for periodically elevating said grinding wheel by pivoting said grinding head about said axis, and means for advancing a saw blade relative to said grinding wheel in a tooth-by-tooth movement when said grinding wheel is elevated, said saw blade advancing means including a rotating shaft carried by said base, a cam on said rotating shaft, linkage pivotally mounted relative to said base and engaged by said cam for pivoting thereby, and a saw blade tooth engaging member carried by said linkage, said grinding wheel elevating means including a second shaft mounted on said base and driven in timed relation to said first shaft, a second cam carried by said second shaft, and second linkage connected to said grinding head engaged by said second cam for pivoting thereby, said second linkage including a support plate for said grinding head and said grinding head including a split mounting block vertically adjustably carried by said support plate, and a bearing unit for said grinding wheel releasably clamped within said mounting block for effecting the longitudinal positioning of said grinding wheel.

6. A circular saw sharpening machine comprising a base, a saw support disposed in front of said base for supporting circular saws in upright positions, an upright frame structure seated on said base generally in alignment with said saw support, a lower shaft mounted on said base and extending transversely thereof adjacent said frame structure, a first cam on the forward end of said lower shaft, means driven by said first cam for advancing a saw blade in a tooth-by-tooth motion, a mounting head carried by said frame structure in elevated overlying relation to said saw support, said mounting head having a rotatable vertical shaft, a support arm secured to said vertical shaft, said support arm having a horizontal shaft, a grinding head carried by said horizontal shaft for pivoting thereon, a first upper shaft and a second upper shaft carried by said frame, a second cam on said first upper shaft and a third cam on said second upper shaft, means driven by said second cam and connected to said support arm for pivoting said grinding head about the axis of said vertical shaft, means driven by said third cam and connected to said grinding head for pivoting said grinding head about the axis of said horizontal shaft, and means connected to all of said shafts for driving all of said cams with said grinding head being repeatedly raised and lowered and while raised swung from one side to another of a central position simultaneously with the operation of said saw advancing means.

7. The machine of claim 6 wherein each of said cam driven means includes a first lever and a second lever and means adjustably connecting said second lever to said first lever to vary the stroke of said second lever for a given stroke of said second lever.

8. The machine of claim 6 wherein said saw support and said saw advancing means are carried by a frame disposed in front of said base.

9. The machine of claim 6 wherein said grinding head is mounted on a support plate which is directly mounted on said horizontal shaft and said grinding head includes a split mounting block vertically adjustably carried by said support plate, and a bearing unit for said grinding wheel releasably clamped within said mounting block for effecting the longitudinal positioning of said grinding wheel.

10. The machine of claim 6 wherein said third cam operated linkage includes a horizontal plate having a curved pressure applying surface to compensate for the swinging of said grinding wheel about the axis of said vertical shaft.

11. The machine of claim 6 wherein said grinding head is driven by a drive unit fixedly mounted on said supporting frame.

12. A saw sharpening machine comprising a base, a grinding head, means carried by said base mounting said grinding head for movement about a horizontal axis, said grinding head including a grinding wheel having an axis of rotation disposed generally normal to said horizontal axis, means for periodically elevating said grinding wheel by pivoting said grinding head about said axis to simultaneously elevate and tilt said grinding wheel, and means for advancing a saw blade relative to said grinding wheel in a tooth-by-tooth movement when said grinding wheel is elevated, said saw blade advancing means including a rotating shaft carried by said base, a cam on said rotating shaft, linkage pivotally mounted relative to said base and engaged by said cam for pivoting thereby, and a saw blade tooth engaging member carried by said linkage, said grinding wheel elevating means including a second shaft mounted on said base and driven in timed relation to said first shaft, a second cam carried by said second shaft, and second linkage connected to said grinding head engaged by said second cam for pivoting thereby, said machine being particularly adapted for sharpening band saw blades and said second linkage including a grinding head support plate and an arm directly connected to said support plate, and a follower on said arm engaged with said second cam, said arm being adjustable relative to said support plate to adjust the position of said grinding wheel to compensate for changes in dimension of said grinding wheel due to wear.

References Cited in the file of this patent
UNITED STATES PATENTS

| | | |
|---|---|---|
| 2,333,298 | Daggett | Nov. 2, 1943 |
| 2,470,290 | Cryst | May 17, 1949 |
| 2,497,775 | Jensen | Feb. 14, 1950 |
| 2,517,873 | Harrell | Aug. 8, 1950 |
| 2,547,553 | Batocchi | Apr. 3, 1951 |

FOREIGN PATENTS

| | | |
|---|---|---|
| 900,646 | Germany | Dec. 28, 1953 |